United States Patent
Tardif et al.

(10) Patent No.: US 10,365,709 B2
(45) Date of Patent: Jul. 30, 2019

(54) MEMS SCANNING DISPLAY DEVICE

(71) Applicant: Microsoft Technology Licensing, LLC, Redmond, WA (US)

(72) Inventors: John Allen Tardif, Sammamish, WA (US); Joshua Owen Miller, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 91 days.

(21) Appl. No.: 15/624,477

(22) Filed: Jun. 15, 2017

(65) Prior Publication Data
US 2018/0255278 A1 Sep. 6, 2018

Related U.S. Application Data

(60) Provisional application No. 62/467,086, filed on Mar. 3, 2017.

(51) Int. Cl.
*G06F 3/01* (2006.01)
*G02B 27/01* (2006.01)
(Continued)

(52) U.S. Cl.
CPC ............ *G06F 3/011* (2013.01); *G02B 26/101* (2013.01); *G02B 26/123* (2013.01);
(Continued)

(58) Field of Classification Search
CPC ............... G02B 26/123; G02B 26/101; G02B 27/0093; G02B 27/0172; G06F 3/011; G06F 3/013
See application file for complete search history.

(56) References Cited

U.S. PATENT DOCUMENTS 6,636,185 B1 * 10/2003 Spitzer .................. A61B 3/113
345/8
7,164,811 B2   1/2007 Nathanson et al.
(Continued)

FOREIGN PATENT DOCUMENTS

JP    2007093644 A    4/2007
KR    20120091810 A   8/2012

OTHER PUBLICATIONS

"International Search Report and Written Opinion Issued in PCT Application No. PCT/US2018/019803", dated May 15, 2018, 14 Pages.
(Continued)

*Primary Examiner* — Liliana Cerullo
(74) *Attorney, Agent, or Firm* — Alleman Hall Creasman & Tuttle LLP (57) ABSTRACT

Examples are disclosed that related to scanning image display systems. In one example, a scanning display system comprises a laser light source comprising two or more offset lasers, a scanning mirror system configured to scan light from the laser light source in a first direction at a higher frequency, and in a second direction at a lower frequency to form an image, and a controller configured to control the scanning mirror system to scan the laser light an interlaced pattern to form the image, and to adjust one or more of a scan rate in the second direction and a phase offset between a first frame and a second frame of the interlaced image.

18 Claims, 7 Drawing Sheets

(51) Int. Cl.
*G02B 26/10* (2006.01)
*G02B 26/12* (2006.01)
*G02B 27/00* (2006.01)

(52) U.S. Cl.
CPC ..... *G02B 27/0093* (2013.01); *G02B 27/0172* (2013.01); *G06F 3/013* (2013.01)

(56) References Cited

U.S. PATENT DOCUMENTS

| | | | |
|---|---|---|---|
| 7,252,394 | B1 | 8/2007 | Fu |
| 7,277,173 | B1 | 10/2007 | Bock et al. |
| 8,049,825 | B2 | 11/2011 | Lescure et al. |
| 8,451,353 | B1 | 5/2013 | Bloom et al. |
| 9,324,250 | B2 | 4/2016 | Basler et al. |
| 2008/0031102 | A1 | 2/2008 | Oettinger et al. |
| 2010/0283413 | A1* | 11/2010 | Richter ............... G02B 26/101 315/360 |
| 2011/0115894 | A1* | 5/2011 | Burnett ............... A61B 3/02 348/78 |
| 2011/0234898 | A1 | 9/2011 | Goren |
| 2012/0105310 | A1 | 5/2012 | Sverdrup et al. |
| 2012/0194891 | A1* | 8/2012 | Borchers ............. G02B 26/101 359/200.7 |
| 2014/0098302 | A1 | 4/2014 | Rumreich |
| 2014/0268294 | A1 | 9/2014 | Brosnihan et al. |
| 2014/0361977 | A1 | 12/2014 | Stafford et al. |
| 2015/0268415 | A1 | 9/2015 | Schowengerdt et al. |
| 2015/0301554 | A1 | 10/2015 | New |
| 2015/0310665 | A1 | 10/2015 | Michail et al. |
| 2016/0189429 | A1 | 6/2016 | Mallinson |
| 2016/0274365 | A1 | 9/2016 | Bailey et al. |
| 2016/0366377 | A1 | 12/2016 | Lim et al. |
| 2017/0076425 | A1 | 3/2017 | Folse |
| 2017/0285343 | A1* | 10/2017 | Belenkii ............ G02B 27/0172 |
| 2018/0143446 | A1* | 5/2018 | Nakamura ............... G09G 3/02 |
| 2018/0288366 | A1 | 10/2018 | Adler et al. |

OTHER PUBLICATIONS

Kim, et al., "Two-axis magnetically-driven MEMS scanning catheter for endoscopic high-speed optical coherence tomography", In Journal of Optics Express, vol. 15, No. 26, Dec. 19, 2007, pp. 18130-18140.

"International Search Report and Written Opinion Issued in PCT Application No. PCT/US2018/019801", dated Nov. 6, 2018, 15 Pages.

"Notice of Allowance Issued in U.S. Appl. No. 15/870,838", dated Jan. 25, 2019, 9 Pages.

* cited by examiner

MEMS SCANNING DISPLAY DEVICE

CROSS REFERENCE TO RELATED APPLICATIONS

This application claims priority to U.S. Provisional Patent Application No. 62/467,086 filed Mar. 3, 2017, the entirety of which is hereby incorporated herein by reference.

BACKGROUND

Some display devices employ laser scanning to produce viewable images. In one example, laser light is reflected by a scanning mirror system at different angles to scan the laser across pixels of a projected image. Control of the light color and/or intensity at each pixel allows the image to be projected.

SUMMARY

Examples are disclosed that related to scanning image display systems. In one example, a scanning display system comprises a laser light source comprising two or more offset lasers, a scanning mirror system configured to scan light from the laser light source in a first direction at a higher frequency, and in a second direction at a lower frequency to form an image, and a controller configured to control the scanning mirror system to scan the laser light an interlaced pattern to form the image, and to adjust one or more of a scan rate in the second direction and a phase offset between a first frame and a second frame of the interlaced image.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As described above, some display devices employ laser scanning to produce viewable images. In one example, laser light is reflected by a mirror system at different angles to project reflected laser light throughout a field-of-view (FOV). To achieve a range of reflection angles, a suitable actuator such as a microelectromechanical system (MEMS) actuator may rotate the mirror system.

A MEMS actuator may rotate a mirror system in horizontal and vertical directions to produce viewable images in a two-dimensional FOV. To this end, the mirror system may include a single mirror driven in both horizontal and vertical directions, or two mirrors separately driven in horizontal and vertical directions. Different scan rates may be employed in the horizontal and vertical directions. In a two mirror system, for example, a horizontally scanned mirror may be driven at a relatively fast rate (e.g., ~10 kHz), whereas a vertically scanned mirror may be driven at a relatively slower rate (e.g., ~60 Hz). The horizontal and vertical scan rates may at least partially determine the resolution of images generated at these rates, along with other factors such as mirror aperture (e.g., diameter) and scan angle.

However, current MEMS technology places an upper limit on mirror scan rates, in turn limiting display resolution. As an example, a 27 kHz horizontal scan rate combined with a 60 Hz vertical scan rate may yield a vertical resolution of 720 p. Significantly higher vertical resolutions (e.g., 1440 p, 2160 p) may be desired, particularly for near-eye display implementations, where 720 p and similar vertical resolutions may appear blurry and low-resolution. While an increase in the horizontal and/or vertical scan rate would increase display resolution, the former may be technologically infeasible while the latter increases power consumption. Further, high scan rates may at least partially constrain mirror scan angle and aperture, where larger values are also desired. Additionally, supporting higher resolution also may require a larger mirror size due to the diffraction limit associated with smaller "pixel" sizes. The use of such a larger mirror may further increase the difficulties in achieving higher resolutions with scanning displays, as the larger mirror leads to a lower scanning frequency.

Examples are thus disclosed for a laser-based MEMS scanning display device configured for high-resolution output. As described below, an interlaced mode of operating multiple lasers may be combined with variable scan rates and/or phase offsets between interlaced frames to achieve desired spacing between laser output, in turn yielding desired image pixel spacing and resolution. The use of multiple lasers allows multiple lines to be scanned per mirror period, thereby allowing higher resolution to be achieved without increasing mirror scan frequencies, and also permits larger mirrors to be used, which may help to avoid issues with pixel size imposed by diffraction limits. Further, examples are disclosed in which output from an eye-tracking sensor is utilized to dynamically alter laser output spacing as a function of user gaze direction.

Figure 1:
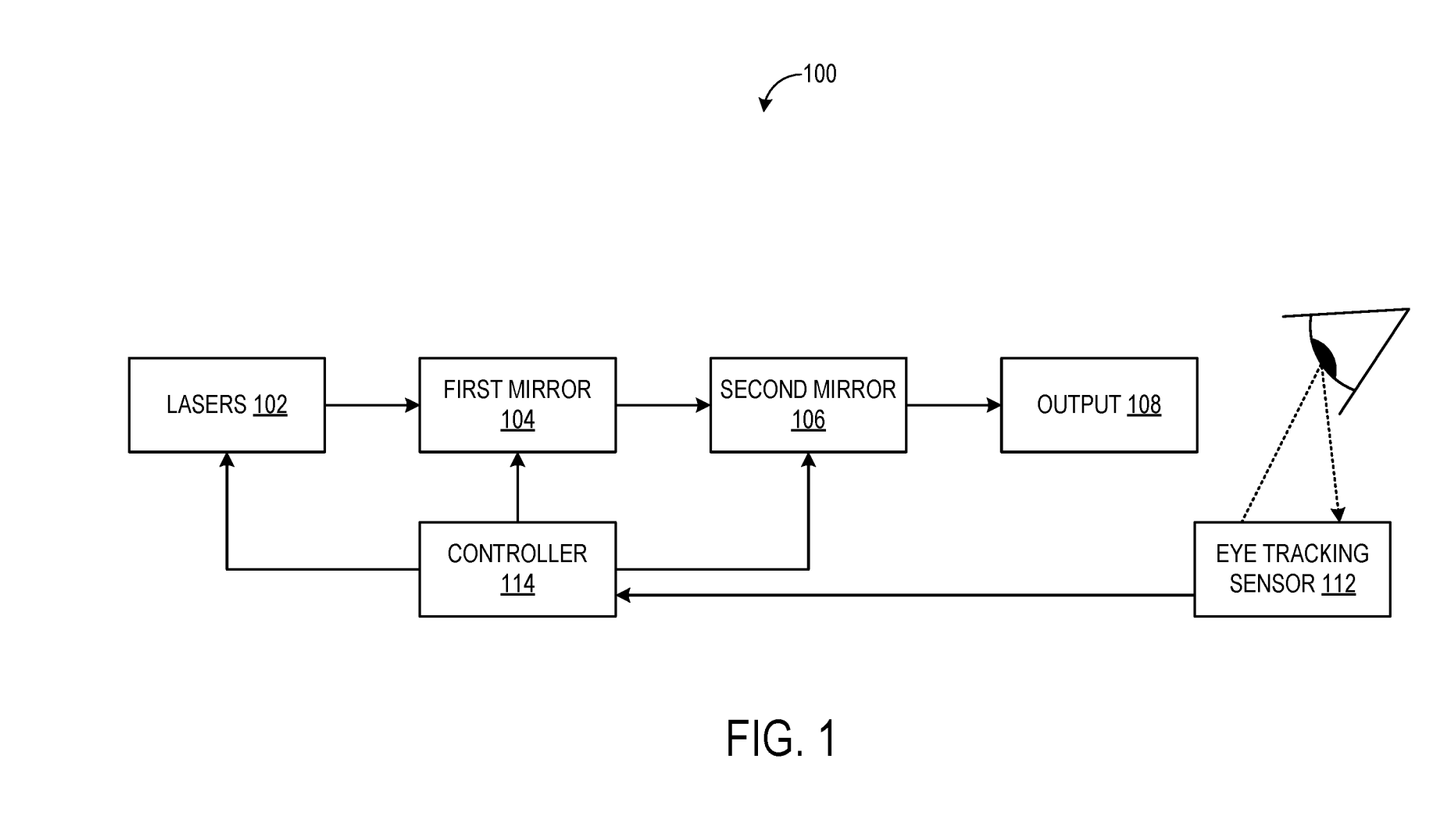
FIG. 1 shows a block diagram of an example laser-based MEMS scanning display device.

FIG. 1 shows a block diagram of an example display device 100, shown as a laser-based MEMS scanning display device. Display device 100 comprises two or more lasers 102, which, as described in further detail below with reference to FIGS. 4 and 5, may assume any suitable form (e.g. a solid state laser), and may output light of one or more wavelengths (e.g., light in red, green, and/or blue wavelength ranges). Lasers 102 output light for reception by a first mirror 104, which reflects light received from the lasers toward a second mirror 106. First mirror 104 may be configured to scan in a horizontal (e.g., x-axis) direction, while second mirror 106 may be configured to scan in a vertical (e.g., y-axis) direction, so that light is ultimately projected throughout a two-dimensional FOV and forms viewable images. In other examples, the first mirror may scan vertically and the second mirror may scan horizontally.

FIG. 1 shows the reflection of light from second mirror 106 toward an output 108 where viewable images are formed. Output 108 may assume any suitable form, such as a display surface, projection optics, waveguide optics, etc. As examples, display device 100 may be configured as a virtual reality head-mounted display (HMD) device with output 108 configured as an opaque surface, or as a mixed reality HMD device with the output configured as a partially transparent surface through which imagery corresponding to the surrounding physical environment can be transmitted and combined with laser light. Display device 100 may assume other suitable forms, such as that of a head-up display, mobile device screen, monitor, television, etc.

To enable the generation of desired images, an actuator 110 separately drives first and second mirrors 104 and 106. In one example, actuator 110 rotates first mirror 104 in the horizontal direction at a first, relatively faster rate (e.g., 27 kHz, 35 kHz), and second mirror 106 in the vertical direction at a second, relatively slower rate (e.g., 60 Hz, 120 Hz). The second rate may be fixed such that second mirror 106 is vertically scanned in a continuous manner, while in other examples the vertical scanning may be carried out stepwise, such that second mirror has a vertical velocity substantially equal to zero prior to completion of a horizontal scan line, and is nonzero upon completion of a horizontal scan line to thereby transition to a subsequent horizontal scan line. Mirrors 104 and 106 may assume any suitable form, such as that of a MEMS actuated mirror (e.g., resonant piezoelectric-actuated).

In some implementations, display device 100 may further comprise an eye tracking sensor 112 operable to detect a gaze direction of a user of the display device. The gaze direction may be mapped to a region in display space to determine a location at output 108 where a user's gaze is directed. As described in further detail below with reference to FIG. 3, one or more operating parameters (e.g., vertical scan rate, phase offset) of display device 100 may be changed in response to a determined location of gaze. Sensor 112 may assume any suitable form. As an example, sensor 112 may comprise one or more light sources (e.g., infrared light sources) configured to cause a glint of light to reflect from the cornea of each eye of a user, and one or more image sensors that capture images of the user's eyes including the glint(s).

Display device 100 further comprises a controller 114 for effecting the approaches described herein. Controller 114 may control operation of lasers 102 (e.g., frequency, intensity, duty cycle) and/or first and/or second mirrors 104 and 106, and may receive output from eye tracking sensor 112 and adjust operation of the lasers, first mirror, and/or second mirror based on the eye tracking sensor output.

Display device 100 may comprise alternative or additional elements not shown in FIG. 1. For example, one or more optical elements (e.g., collimator, diffuser, combiner, convergent lens, divergent lens, holographic element) may be placed in the optical path along which laser light travels to achieve desired display characteristics. Display device 100 may further include a suitable power source (e.g., battery, power supply) to provide electrical power to the active elements of the display device. Moreover, various modifications to display device 100 are contemplated, such as the inclusion of a single mirror in lieu of first and second mirrors 104 and 106, where the single mirror is scanned in both the horizontal and vertical directions.

Figure 2:
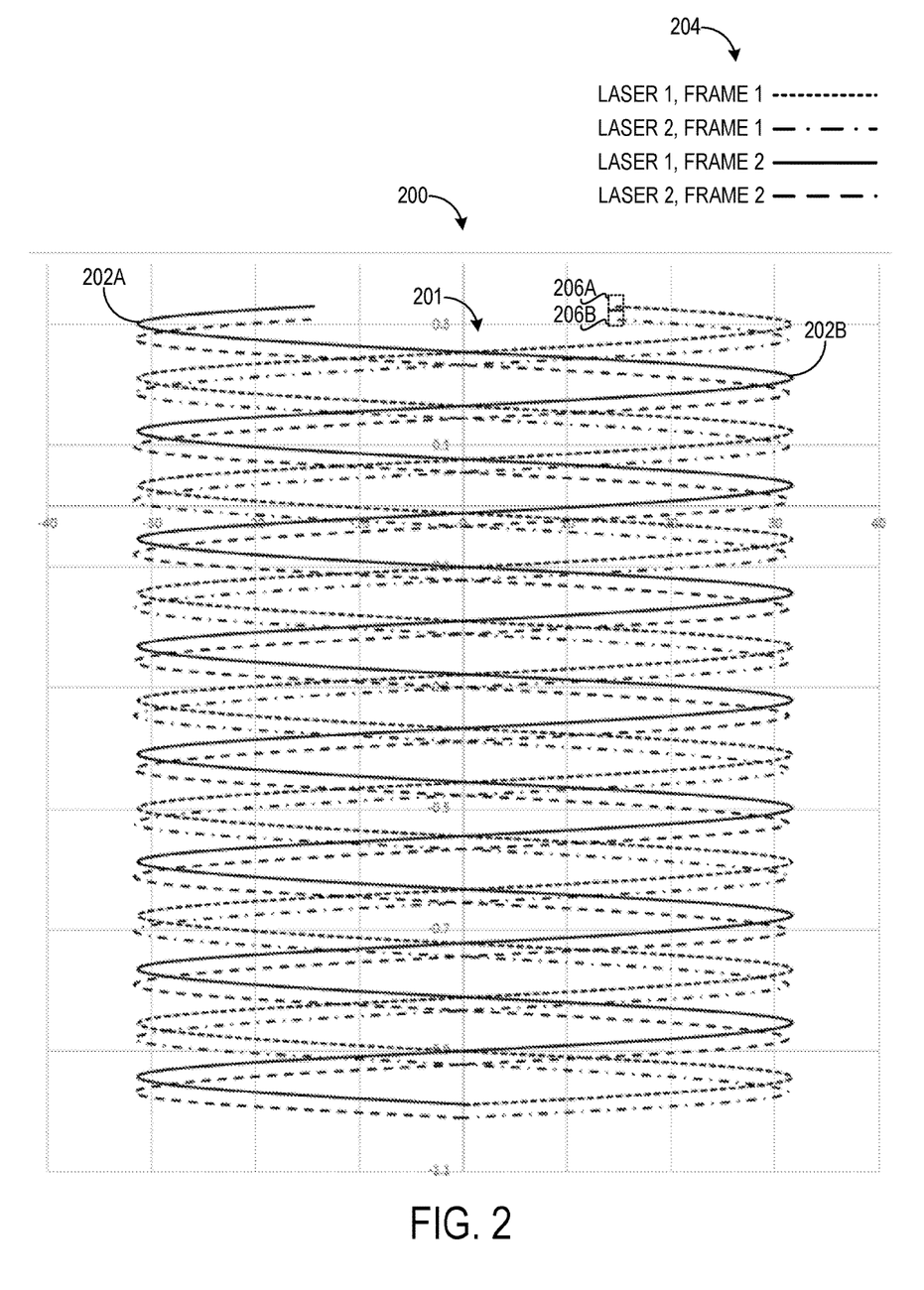
FIG. 2 shows an example laser trace diagram.

FIG. 2 shows an example laser trace diagram 200. Diagram 200 illustrates optical output that may be produced by display device 100 of FIG. 1, for example. Four laser traces corresponding to the output of two lasers in two different frames, which may be successively interlaced, are shown. Each trace corresponds to light produced in display space in an FOV 201—for example, at output 108 of FIG. 1. Thus, the portion of a laser trace between successive turning points, such as turning points 202A and 202B, may correspond to a horizontal row of perceived image pixels drawn by that laser trace. In some examples, the turning points may be outside of the image frame.

As indicated at a legend 204, diagram 200 shows a trace of a first laser in a first frame, a trace of a second laser in the first frame, a trace of the first laser in a second frame, and a trace of the second laser in the second frame. In the first frame, the traces of the first and second lasers may be vertically separated in display space by one line. Thus, the traces of the first and second lasers may produce light at vertically adjacent image pixels that are vertically aligned. As an example, FIG. 2 shows vertically adjacent, vertically aligned image pixels 206A and 206B that may be generated by the first and second lasers in the first frame.

The example shown in FIG. 2 may correspond to an approach in which horizontal mirror scanning is achieved with an actuator that harmonically oscillates with substantially sinusoidal motion. Accordingly, the laser traces may exhibit at least partial sinusoidal motion; as shown in FIG. 2, each laser trace scans a horizontal row of image pixels in a half period (e.g., pi rad) of a sine wave, such that two horizontal traces are scanned in a full period (e.g., 2*pi rad) of the sine wave. Controlling the vertical mirror allows these two traces to produce two traces of horizontal image pixels.

In this formulation, the interlacing of the first and second frames, and other successive, alternate frames, may include applying a phase offset between alternate frames. As an example, FIG. 2 shows a phase offset of pi radians applied to corresponding sinusoidal waves between the first and second frames. By applying a phase offset between alternate frames in this manner, a more consistent distribution of light throughout FOV 201, and thus higher resolution imagery and brightness consistency, may be achieved. In view of the high-frequency scanning rate employed by the horizontal mirror in this example, controlling the scanning behavior of the high-frequency horizontal mirror may pose difficulties, as adjusting the scanning rate may interrupt the harmonic oscillation. As such, the phase offset is accomplished by controlling the slower scanning vertical mirror to start vertically scanning either earlier or later in the horizontal scan period, depending upon the adjustment desired. Further, by selecting a sufficiently high alternating frequency between interlaced frames, a stable image without unacceptable flickering may be produced in which light from both frames appears simultaneously to viewers. As an example, each frame may be displayed at a vertical scan frequency of 120 Hz, with a progressive image formed by first and second alternate frames being displayed at a vertical scan frequency of 60 Hz.

While a single line (e.g., pixel) spacing may be achieved at certain regions within FOV 201, less desirable spacing may result in other regions within the FOV. In the example depicted in FIG. 2, a high degree of overlap results in output from each laser in the first frame and the same corresponding laser in the second frame within horizontal angles near 0 deg in FOV 201. In contrast, more desirable single line spacing is achieved toward the edges of FOV 201—e.g., between horizontal angles of +/−15 and +/−30 deg. Undesirable variance in resolution and brightness may result from such variance in line spacing throughout FOV 201. To address such variance, the phase offset between alternate frames may be adjusted by adjusting the vertical scanning mirror.

Figure 3:
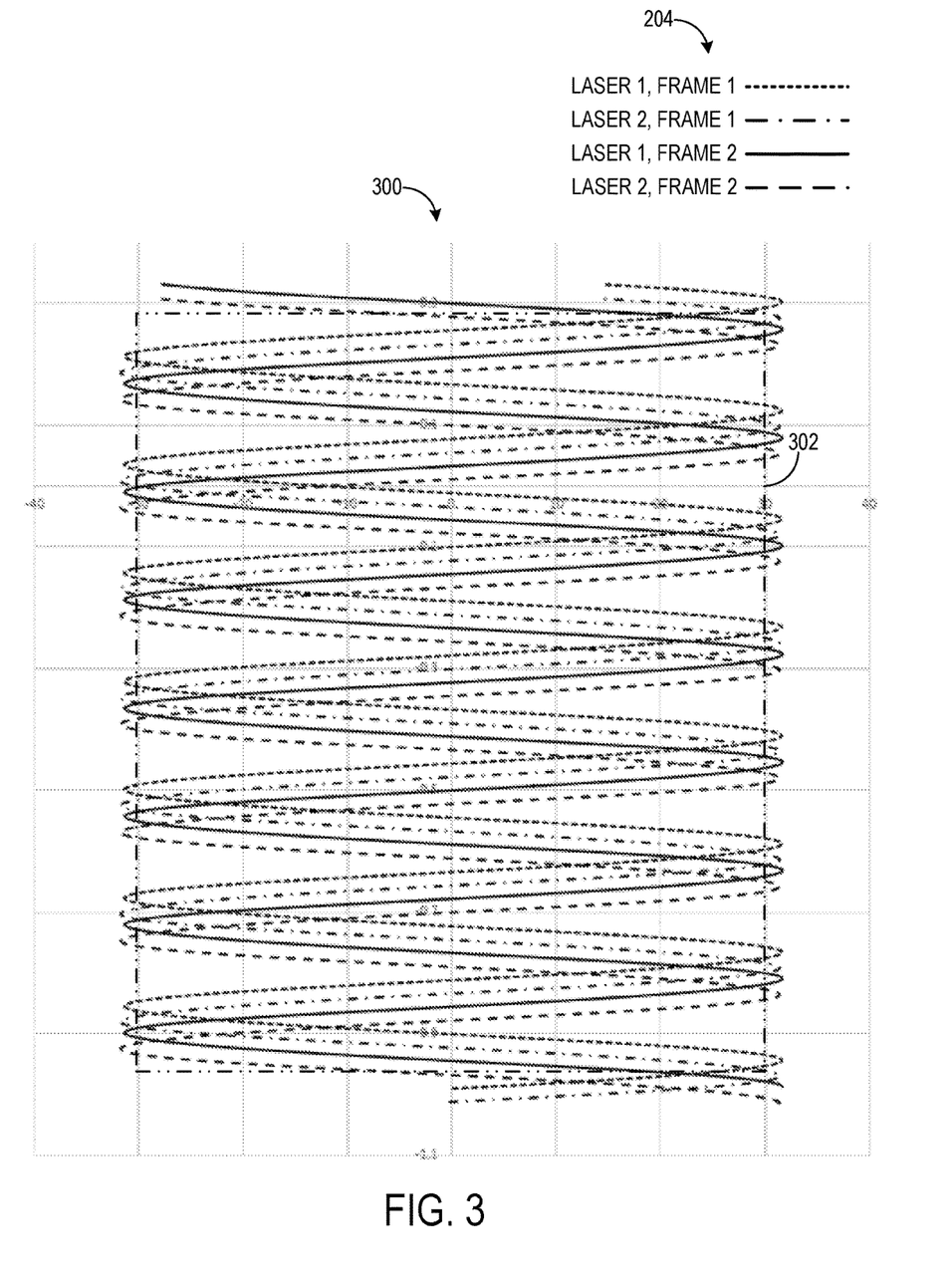
FIG. 3 shows another example laser trace diagram.

FIG. 3 shows an example laser trace diagram 300 produced with a phase offset of pi/2 radians between alternate frames. In contrast to laser trace diagram 200 of FIG. 2, produced with a phase offset of pi radians, FIG. 3 illustrates how the use of a pi/2 radian offset yields single line spacing at other regions within FOV 201, such as within horizontal angles near 0 deg. Less desirable spacing, and laser output overlap, result in horizontal angles toward the edges of FOV 201—e.g., between angles of +/−15 and +/−30 deg.

The laser trace diagrams shown in FIGS. 2 and 3 illustrate how adjustment of the phase offset between alternate frames in interlaced, laser-scanned output generates desired line and image pixel spacing at different regions of an FOV in display space. This approach may be extended to the use of any suitable set of phase offsets to achieve desired line spacing at any region of an FOV. Further, phase offset adjustment may be dynamically employed during operating of a display device to achieve desired line spacing in regions where a user's gaze is directed—e.g., between the end of a frame and beginning of a subsequent during a vertical blank interval. For example with reference to FIG. 1, controller 114 may utilize output from eye tracking sensor 112 indicating a user's gaze direction to determine a region within a FOV of output 108 where the user's gaze is directed. Controller 114 may then select a phase offset in response to this determination to achieve a desired line spacing in the region where the user's gaze is directed, thereby optimizing display output perceived by the user throughout operation of display device 100. Any suitable level of granularity may be employed in the course of dynamically adjusting phase offsets. As an example, an FOV may be divided into quadrants, with a respective phase offset being associated with each quadrant and used to achieve desired line spacing in that quadrant. However, the FOV may be divided into any suitable number regions with any suitable geometry, which may be equal or unequal, and regular or irregular. As another example, a substantially continuous function may be used to map gaze points in the FOV to phase offsets. Monte Carlo testing, for example, may be performed to determine a set of mappings between gaze points and phase offsets.

It will be understood that FIGS. 2 and 3 are provided as examples and are not intended to be limiting in any way. Laser trace diagrams 200 and 300, for example, may represent laser output prior to processing by one or more optical elements that may be included in display device 100 of FIG. 1. Further, any suitable integer number n of lasers may be used, with the vertical resolution of images being proportional to n—e.g., an increase in n number of lasers from 2 to 4 doubles the vertical resolution. Still further, any suitable vertical refresh rate may be used, where increases in the vertical refresh rate reduce the vertical resolution—e.g., a doubling of the vertical refresh rate reduces the vertical resolution by half. As such, the number n of lasers and the vertical refresh rate may be balanced to achieve desired display output. Yet further, a subset of diagrams 200 and 300 may be selected as an FOV in which imagery is provided to viewers. As an example with reference to FIG. 3, an example FOV 302 is shown that omits a portion of the laser traces in diagram 300. The omitted portion may correspond to regions where laser output is asymmetric, vertically misaligned (as in the horizontal extremities of diagram 300), or otherwise undesired. The omitted portion may be designated an overscan region, in which laser output is disabled (e.g., by ceasing power supply to the lasers).

Figure 4:
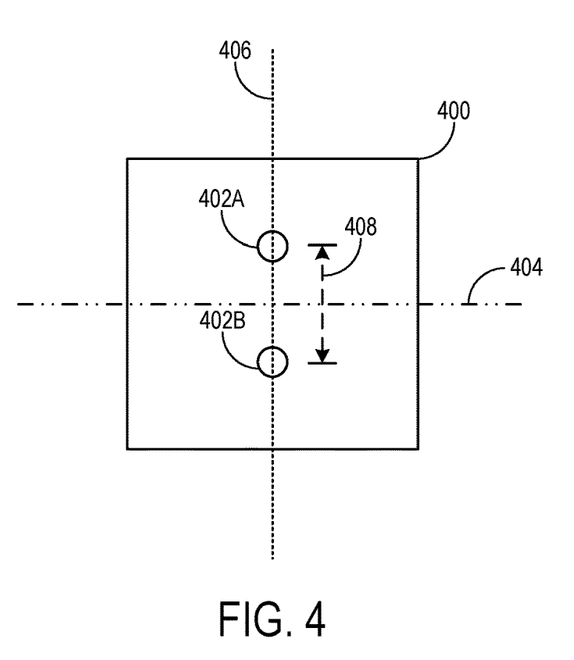
FIG. 4 shows an example laser die at a first rotational orientation.

Various laser configurations may be used to generate single, and other desired, line spacings. As one example, FIG. 4 shows an example laser die 400 comprising two solid-state lasers 402A and 402B. Lasers 402A and 402B may be arranged on laser die 400 via suitable lithographic processes, for example. In the orientation shown in FIG. 4, laser die 400 is centered about an x-axis 404 and a y-axis 406, which may respectively correspond to horizontal and vertical axes along which one or more mirrors (e.g., first and second mirrors 104 and 106 of FIG. 1) are scanned. Further, lasers 402A and 402B are aligned to, and spaced along, vertical axis 406 by a vertical separation distance 408 measured along the vertical axis from laser center to laser center. Separation distance 408 may be selected to achieve desired laser operation and avoid undesired issues associated with excessively narrow spacing between lasers 402A and 402B, such as thermal crosstalk. Separation distance 408 may further accommodate the arrangement of structural and electrical elements required to form laser die 400 and operate lasers 402A and 402B, along with mechanical tolerances. As one example, separation distance 408 may be substantially equal to 15 microns.

This and other vertical separation distances, however, may manifest in line spacings greater than one line in display space. As described in further detail below, specific vertical refresh rates and/or phase offsets may be selected to compensate and achieve single line spacing.

Figure 5:
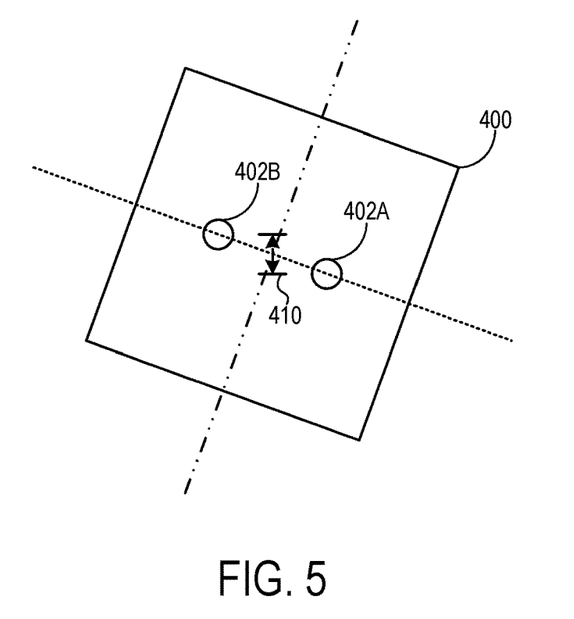
FIG. 5 shows the example laser die of FIG. 4 at a second rotational orientation.

Single line spacing may be achieved with laser die 400 by rotating the laser die relative to the orientation shown in FIG. 4, and providing laser light to a mirror system at the rotated orientation. To this end, FIG. 5 shows laser die 400 in a rotated orientation relative to the orientation shown in FIG. 4. The rotated orientation is selected to achieve a reduced vertical separation distance 410 relative to vertical separation distance 408 of the non-rotated orientation. Vertical separation distance 410 may be substantially equal to one micron, for example. In this way, single line spacing may be achieved in display space with laser die 400, which may have a 15 micron or similar vertical separation distance in the non-rotated orientation. Due to mechanical tolerances, a rotation error may occur in rotation laser die 400, which may manifest as a line spacing error in display space. To compensate, the vertical refresh rate may be adjusted with known mechanical spacing between lasers 402A and 402B, and characterized thermal variance of laser die 400. As an example, a line spacing in display space greater than one line may be compensated by increasing the vertical refresh rate at the expense of some vertical resolution to achieve single line spacing. Laser trace diagrams 200 and 300 of FIGS. 2 and 3 may be produced by laser die 400 arranged in the rotated orientation, for example.

Figure 6:
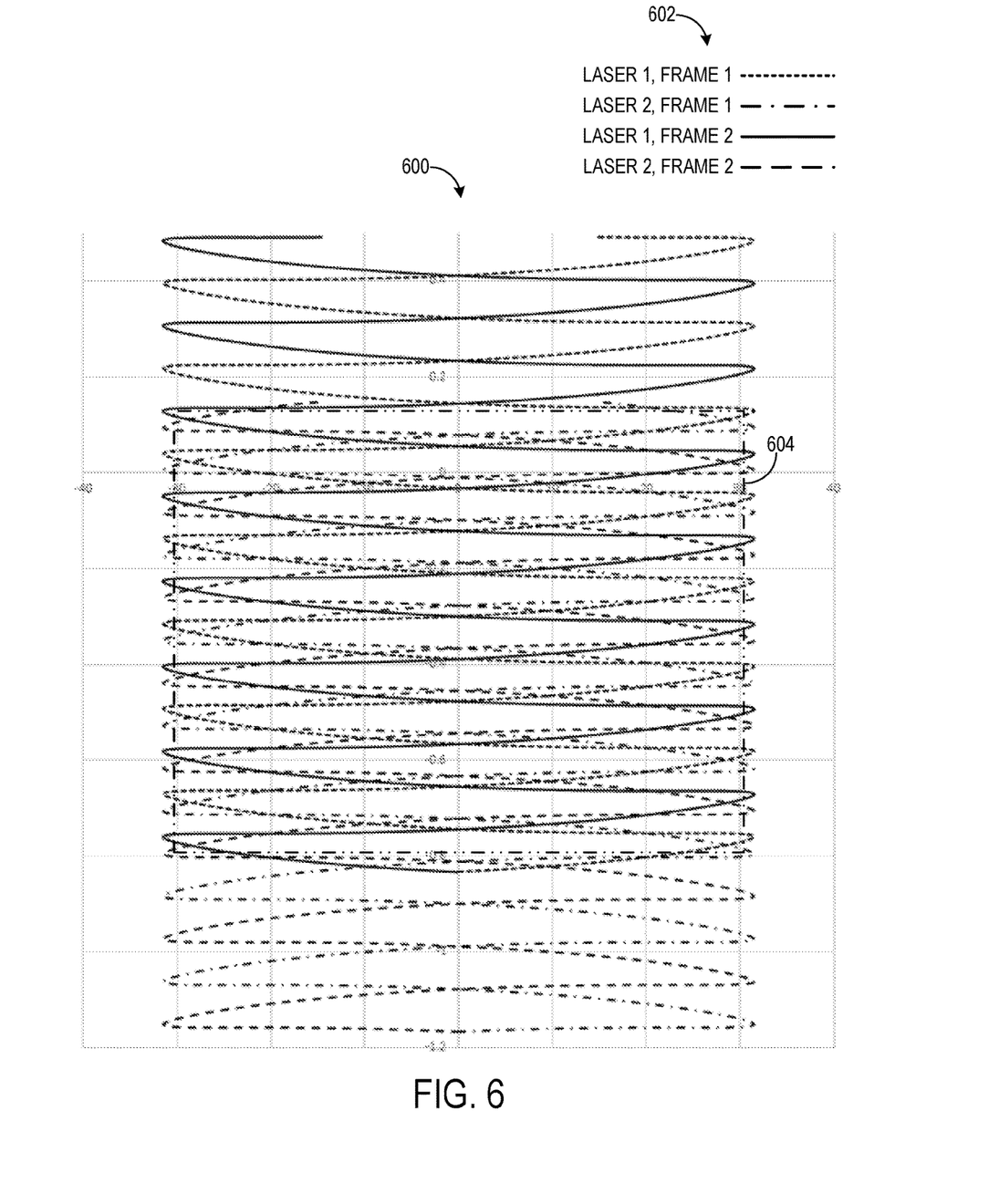
FIG. 6 shows another example laser trace diagram.

FIG. 6 shows an example laser trace diagram 600, including laser traces from two lasers in two alternate frames, as indicated by a legend 602. Diagram 600 may represent laser output produced by a laser die oriented with a vertical separation between lasers greater than a spacing that results in a single line in display space, such as laser die 400 in the orientation shown in FIG. 4 with vertical separation distance 408 between lasers 402A and 402B. In this example, a sinusoidal profile otherwise assumed by the laser traces is distorted due to the vertical laser separation distance, resulting in a 'bow' shape to the laser traces arising from scanning mirror effects. Further, the nature of the distorted sinusoids differs between lasers—the first laser exhibits greater downward curvature during a horizontal line scan, whereas the second laser exhibits a greater upward curvature during a horizontal line scan. However, desired single, and other, line spacings in display space may be achieved by adjusting the vertical refresh rate as described above. For vertical separation distance 408, for example, the vertical refresh rate may be varied to adjust line spacing and/or resolution while still retaining an integer number of horizontal lines in the image. For example, this may allow scanning to occur faster in non-foveal regions (e.g. in a user's peripheral view) than in foveal regions (e.g. in the user's line of gaze) to achieve foveated display using eye tracking data.

Figure 7:
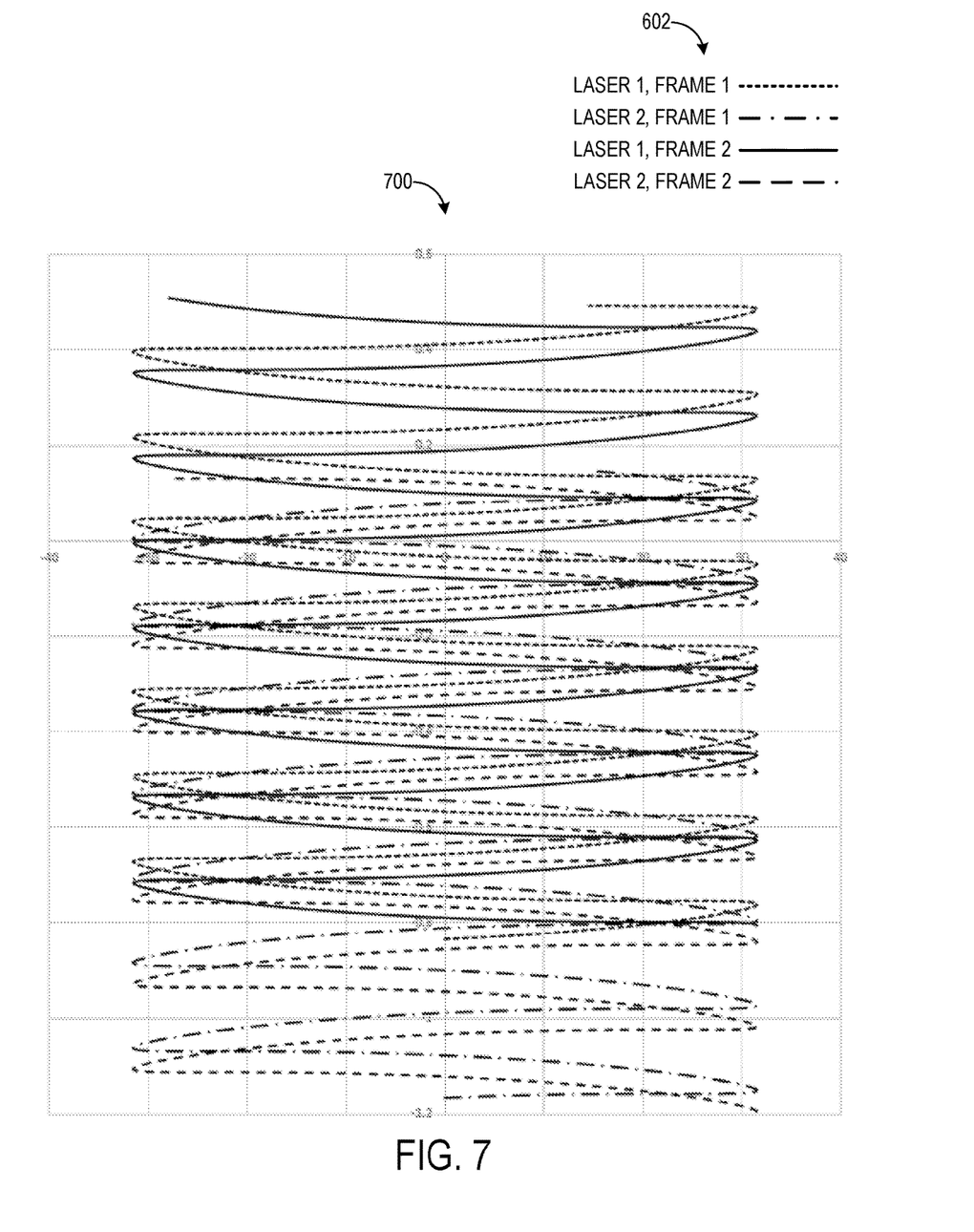
FIG. 7 shows another example laser trace diagram.

The phase offset between interlaced frames generated by laser die 400 with vertical separation distance 408 may be adjusted to produce desired line spacings in certain parts of FOV 604, as described above. FIG. 7 shows an example laser trace diagram 700 resulting from a change in a phase offset of pi radians used to produce diagram 600 to a phase offset of pi/2 radians. In contrast to diagram 600, in which undesired line spacing and laser output overlap occurred in horizontal angles proximate 0 deg, the pi/2 radian phase offset represented by diagram 700 results in desired line spacing in the horizontal angles proximate 0 deg. As described above, output from eye tracking sensor 112 of FIG. 1 may be used to dynamically adjust the phase offset to achieve desired line spacing in response to user gaze.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
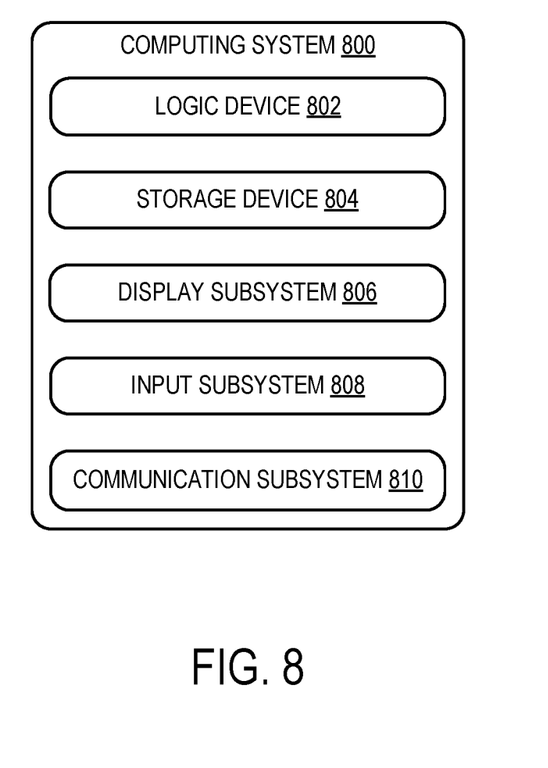
FIG. 8 shows a block diagram of an example computing device.

FIG. 8 schematically shows a non-limiting embodiment of a Computing system 800 that can enact one or more of the methods and processes described above. Computing system 800 is shown in simplified form. Computing system 800 may take the form of one or more personal computers, server computers, tablet computers, home-entertainment computers, network computing devices, gaming devices, mobile computing devices, mobile communication devices (e.g., smart phone), and/or other computing devices.

Computing system 800 includes a Logic machine 802 and a storage machine 804. Computing system 800 may optionally include a display subsystem 806, input subsystem 808, communication subsystem 810, and/or other components not shown in FIG. 8.

Logic machine 802 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 804 includes one or more physical devices configured to hold instructions executable by the logic machine to implement the methods and processes described herein. When such methods and processes are implemented, the state of storage machine 804 may be transformed—e.g., to hold different data.

Storage machine 804 may include removable and/or built-in devices. Storage machine 804 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 804 may include volatile, nonvolatile, dynamic, static, read/write, read-only, random-access, sequential-access, location-addressable, file-addressable, and/or content-addressable devices.

It will be appreciated that storage machine 804 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 802 and storage machine 804 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of Computing system 800 implemented to perform a particular function. In some cases, a module, program, or engine may be instantiated via Logic machine 802 executing instructions held by storage machine 804. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 806 may be used to present a visual representation of data held by storage machine 804. This visual representation may take the form of a graphical user interface (GUI). As the herein described methods and processes change the data held by the storage machine, and thus transform the state of the storage machine, the state of display subsystem 806 may likewise be transformed to visually represent changes in the underlying data. Display subsystem 806 may include one or more display devices utilizing virtually any type of technology. Such display devices may be combined with Logic machine 802 and/or storage machine 804 in a shared enclosure, or such display devices may be peripheral display devices.

When included, input subsystem 808 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 810 may be configured to communicatively couple with one or more other computing devices. Communication subsystem 810 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow Computing system 800 to send and/or receive messages to and/or from other devices via a network such as the Internet.

Another example provides a scanning display system comprising a laser light source comprising two or more offset lasers, a scanning mirror system configured to scan light from the laser light source in a first direction at a higher frequency, and in a second direction at a lower frequency to form an image, and a controller configured to control the scanning mirror system to scan the laser light an interlaced pattern to form the image, and to adjust one or more of a scan rate in the second direction and a phase offset between a first frame and a second frame of the interlaced image. In such an example, the scanning mirror system alternatively or additionally may comprise a first mirror configured to scan the laser light in the first direction, and a second mirror configured to scan the laser light in the second direction. In such an example, the controller alternatively or additionally may be configured to adjust the phase offset between the first frame and the second frame by adjusting a time at which the scanning mirror system initiates the scanning of the laser light in the second direction relative to the scanning of the laser light in the first direction. In such an example, the controller alternatively or additionally may be configured to adjust the phase offset between the first frame and the second frame based on a desired line spacing at a region in the image. In such an example, the region alternatively or additionally may be one of a plurality of regions in the image, and the controller alternatively or additionally may be configured to associate a respective phase offset with each of the plurality of regions. In such an example, the scanning display system alternatively or additionally may comprise an eye tracking sensor configured to detect a gaze direction of a user, and the controller alternatively or additionally may be configured to map the gaze direction to a region in the image, and to adjust one or more of the scan rate in the second direction and the phase offset based on the region in the image. In such an example, the controller alternatively or additionally may be configured to adjust the phase offset in a first manner based on mapping the gaze direction to a first region in the image, and to adjust the phase offset in a second manner based on mapping the gaze direction to a second region in the image. In such an example, the region alternatively or additionally may be a foveal region of the image, the image alternatively or additionally may comprise a non-foveal region, and the controller alternatively or additionally may be configured to increase the scan rate in the second direction in the non-foveal region and to decrease the scan rate in the second direction in the foveal region. In such an example, the two or more offset lasers alternatively or additionally may be vertically offset in a center-aligned orientation relative to the second scan direction. In such an example, the laser light source alternatively or additionally may be configured to output light of multiple colors. In such an example, the controller alternatively or additionally may be configured to compensate for a line spacing error in the rotated orientation by adjusting the scan rate in the second direction. In such an example, the scanning mirror system alternatively or additionally may be configured to scan a horizontal line of the image in a half period of a microelectromechanical actuator that drives the scanning mirror system. In such an example, the scanning display system alternatively or additionally may be configured to scan in the first direction at a frequency of 27 kHz to 35 kHz. In such an example, the controller alternatively or additionally may be configured to control the mirror system to form the image at a resolution between 1440 p and 2160 p.

Another example provides a method of displaying an image comprising directing light from two or more offset lasers toward a scanning mirror system, and scanning light from the two or more offset lasers in a first direction at a higher frequency and in a second direction at a lower frequency to thereby scan the laser light in an interlaced pattern and form the image. In such an example, the method alternatively or additionally may comprise mapping a gaze direction determined via an eye tracking sensor to a region in the image, and adjusting one or more of the scan rate in the second direction and the phase offset based on the region in the image. In such an example, scanning the light from the two or more offset lasers in the first direction alternatively or additionally may comprise scanning the light in the first direction at a frequency of 27 kHz to 35 kHz. In such an example, scanning the light from the two or more offset lasers alternatively or additionally may comprise scanning the light to form the image at a resolution between 1440 p and 2160 p.

Another example provides a scanning display system comprising a laser light source comprising two or more offset lasers, a scanning mirror system configured to scan light from the laser light source in a first direction at a higher frequency, and in a second direction at a lower frequency to form an image, an eye tracking sensor, and a controller configured to determine a gaze direction via data from the eye tracking sensor, to control the scanning mirror system to scan the laser light an interlaced pattern to form the image, and to adjust one or more of a scan rate in the second direction and a phase offset between a first frame and a second frame of the interlaced image based at least on the gaze direction. In such an example, the display system alternatively or additionally may comprise a head-mounted display system.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A scanning display system, comprising:
a laser light source comprising two or more offset lasers;
a scanning mirror system configured to scan light from the laser light source in a first direction at a higher frequency, and in a second direction at a lower frequency to form an image;
an eye tracking sensor configured to detect a gaze direction of a user; and
a controller configured to map the gaze direction to a region in the image, control the scanning mirror system to scan the laser light an interlaced pattern to form the image, and adjust one or more of a scan rate in the second direction and a phase offset between a first frame and a second frame of the image based at least on the region in the image.

2. The scanning display system of claim 1, wherein the scanning mirror system comprises a first mirror configured to scan the laser light in the first direction, and a second mirror configured to scan the laser light in the second direction.

3. The scanning display system of claim 1, wherein the controller is configured to adjust the phase offset between the first frame and the second frame by adjusting a time at which the scanning mirror system initiates the scanning of the laser light in the second direction relative to the scanning of the laser light in the first direction.

4. The scanning display system of claim 1, wherein the controller is configured to adjust the phase offset between the first frame and the second frame based on a desired line spacing at the region in the image.

5. The scanning display system of claim 4, wherein the region is one of a plurality of regions in the image, and wherein the controller is configured to associate a respective phase offset with each of the plurality of regions.

6. The scanning display system of claim 1, wherein the controller is further configured to adjust the phase offset in a first manner based on mapping the gaze direction to a first region in the image, and to adjust the phase offset in a second manner based on mapping the gaze direction to a second region in the image.

7. The scanning display system of claim 1, wherein the region is a foveal region of the image, the image comprising a non-foveal region, and wherein the controller is further configured to increase the scan rate in the second direction in the non-foveal region and to decrease the scan rate in the second direction in the foveal region.

8. The scanning display system of claim 1, wherein the two or more offset lasers are vertically offset in a center-aligned orientation relative to the second direction.

9. The scanning display system of claim 1, wherein the laser light source is configured to output light of multiple colors.

10. The scanning display system of claim 8, wherein the controller is further configured to compensate for a line spacing error in the vertically offset orientation by adjusting the scan rate in the second direction.

11. The scanning display system of claim 1, wherein the scanning mirror system is configured to scan a horizontal line of the image in a half period of a microelectromechanical actuator that drives the scanning mirror system.

12. The scanning display system of claim 1, wherein the scanning display system is configured to scan in the first direction at a frequency of 27 kHz to 35 kHz.

13. The scanning display system of claim 1, wherein the controller is configured to control the mirror system to form the image at a resolution between 1440 p and 2160 p.

14. A method of displaying an image, comprising:
directing light from two or more offset lasers toward a scanning mirror system;
scanning light from the two or more offset lasers in a first direction at a higher frequency and in a second direction at a lower frequency to thereby scan the laser light in an interlaced pattern and form the image;
mapping a gaze direction determined via an eye tracking sensor to a region in the image; and
adjusting one or more of a scan rate in the second direction and a phase offset based on the region in the image.

15. The method of claim 14, wherein scanning the light from the two or more offset lasers in the first direction comprises scanning the light in the first direction at a frequency of 27 kHz to 35 kHz.

16. The method of claim 14, wherein scanning the light from the two or more offset lasers comprises scanning the light to form the image at a resolution between 1440 p and 2160 p.

17. A scanning display system, comprising:
a laser light source comprising two or more offset lasers;
a scanning mirror system configured to scan light from the laser light source in a first direction at a higher frequency, and in a second direction at a lower frequency to form an image;
an eye tracking sensor; and
a controller configured to determine a gaze direction via data from the eye tracking sensor, to control the scanning mirror system to scan the laser light an interlaced pattern to form the image, and to adjust one or more of a scan rate in the second direction and a phase offset between a first frame and a second frame of the interlaced image based at least on the gaze direction.

18. The scanning display system of claim 17, wherein the display system comprises a head-mounted display system.

* * * * *